United States Patent [19]

Botnick

[11] 3,941,152

[45] Mar. 2, 1976

[54] DRAINABLE SHUTOFF VALVE WITH FILTER

[76] Inventor: Irlin H. Botnick, 3155 Kersdale, Pepper Pike, Ohio 44124

[22] Filed: Mar. 18, 1975

[21] Appl. No.: 559,582

Related U.S. Application Data

[63] Continuation-in-part of Ser. No. 424,898, Dec. 14, 1973, Pat. No. 3,891,001.

[52] U.S. Cl. .......................... 137/549; 137/625.26
[51] Int. Cl.² ..................... E03B 7/07; F16K 11/06
[58] Field of Search .... 137/549, 596, 627.5, 625.26

[56] References Cited
UNITED STATES PATENTS
3,249,123   5/1966   Berg .............................. 137/625.26

*Primary Examiner*—Henry T. Klinksiek
*Attorney, Agent, or Firm*—P. D. Golrick

[57] ABSTRACT

A handle-carrying operating plug serving also a valve body-closing bonnet function, having a threaded internal engagement with the body, has a sliding relatively rotatable lost motion connection with an internal valving stem carrying a valving member, whereby the valving member, displaced to open position by plug-rotation in one direction, is permitted to advance in the body from an open position to a closed position under water flow or static pressure or/and spring bias, as the plug moves out upon rotation in the other direction for valve closing, and with a permitted further plug member rotation after valve closing, a drainage passage through the plug opens by relative axial motion of plug and stem; and by further rotation the plug is withdrawable for cleaning of a filter on the outlet side of the valving region in the body, the filter being plug-supported, spring biased to follow the plug to the body mouth, or merely body supported; ensuring a shut off condition when the valve body is opened for cleaning or line drainage. Cartridge and non-cartridge forms are disclosed.

22 Claims, 7 Drawing Figures

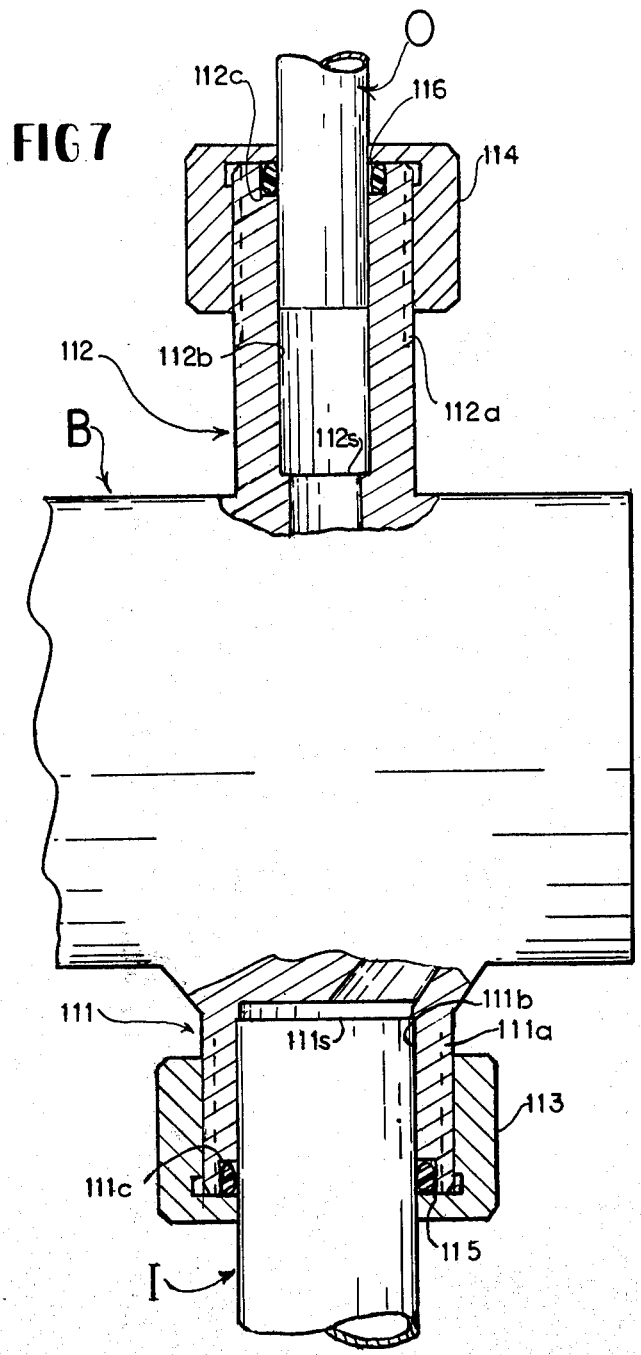

DRAINABLE SHUTOFF VALVE WITH FILTER

This application is a continuation-in-part of copending application Ser. No. 424,898, filed Dec. 14, 1973, now U.S. Pat. No. 3,891,001.

In the valve prior art, water shutoff valves providing for drainage of the line on the valve discharge side after the valve is shut off, so-called stop-and-waste valves, have been long known; and so also valves including a device to filter out dirt or debris entering from the inlet line. Various disadvantages have attended prior valve structures providing the described functions, whether merely proposed or actually commercially produced. Commonly with valves and faucets generally, the valving seal element compressed against a seat has been subject to damage by over-tightening on closure. In drainable valves, i.e., stop-and-waste valves, the drainage control expedients have been unreliable or subject to easy damage in use, or the drainage has been slow. Valves with a filter element accessible for cleanout often have been awkward to clean, or had low filter capacity requiring in some installations frequent cleaning. Even for valves with strainers built in, especially on the inlet side, as well as for separate strainer units, to clean the filter or screen element involves closing an upstream shutoff valve, opening the strainer, often with considerabe outpour of water, for the cleaning service, recapping, and then opening the shutoff valve to put the line back in service.

Consequently cleaning operations were unduly time consuming, and by frequent repetition often were subjecting the valve to considerable wear and tear. Further when the valve body would be opened to the environment for drainage or filter cleaning, since at times there would be a head of water in the controlled discharge line, or the valve could be left on, therefore under supply pressure, one servicing the same could be sprayed or flooded with water, a dangerous accident with the water hot. Or the structures have been relatively complicated or expensive in fabrication for the function involved and the avoidance of other problems.

The present invention offers a relatively simple shut-off valve structure, incorporating a filter screen device of relatively high capacity without undue plugging. It affords a simple cleanout procedure, while automatically ensuring that the valve is turned off; and also enables rapid drainage of the outlet or discharge line at the start of cleaning operations. Moreover, the valve structure for conjointly attaining these advantageous characteristics can be manufactured at comparatively low cost, with a comparatively long service life to be expected, and with an easily replaceable seat.

The general object of the present invention is to provide a shutoff valve incorporating a cleanable filter element and also enabling quick line drainage.

Another object is to provide a simple shutoff valve with filter element easily accessible for cleaning.

Another object is to provide a valve of the character described which automatically ensures that the water is shut off before the valve body can be opened in drainage or filter removal operations.

A further object is to provide a filtering valve of the character described incorporating valving, filtering, and drainage structure in a cartridge arrangement.

Another object is to provide a filtering valve of the character described assuring against returning the line to service without screen after a shut off for filter cleaning.

A still further object is to provide a valve of the character described which has a durable comparatively low cost structure.

Other objects and advantages will appear from the following description and the drawing in which:

FIG. 7 is a fragmentary view partially in elevation, partly in section, of a valve showing a modification of the fitting connection to obtain a union function.

GENERAL STRUCTURE — FIG. 1

Figure 1:
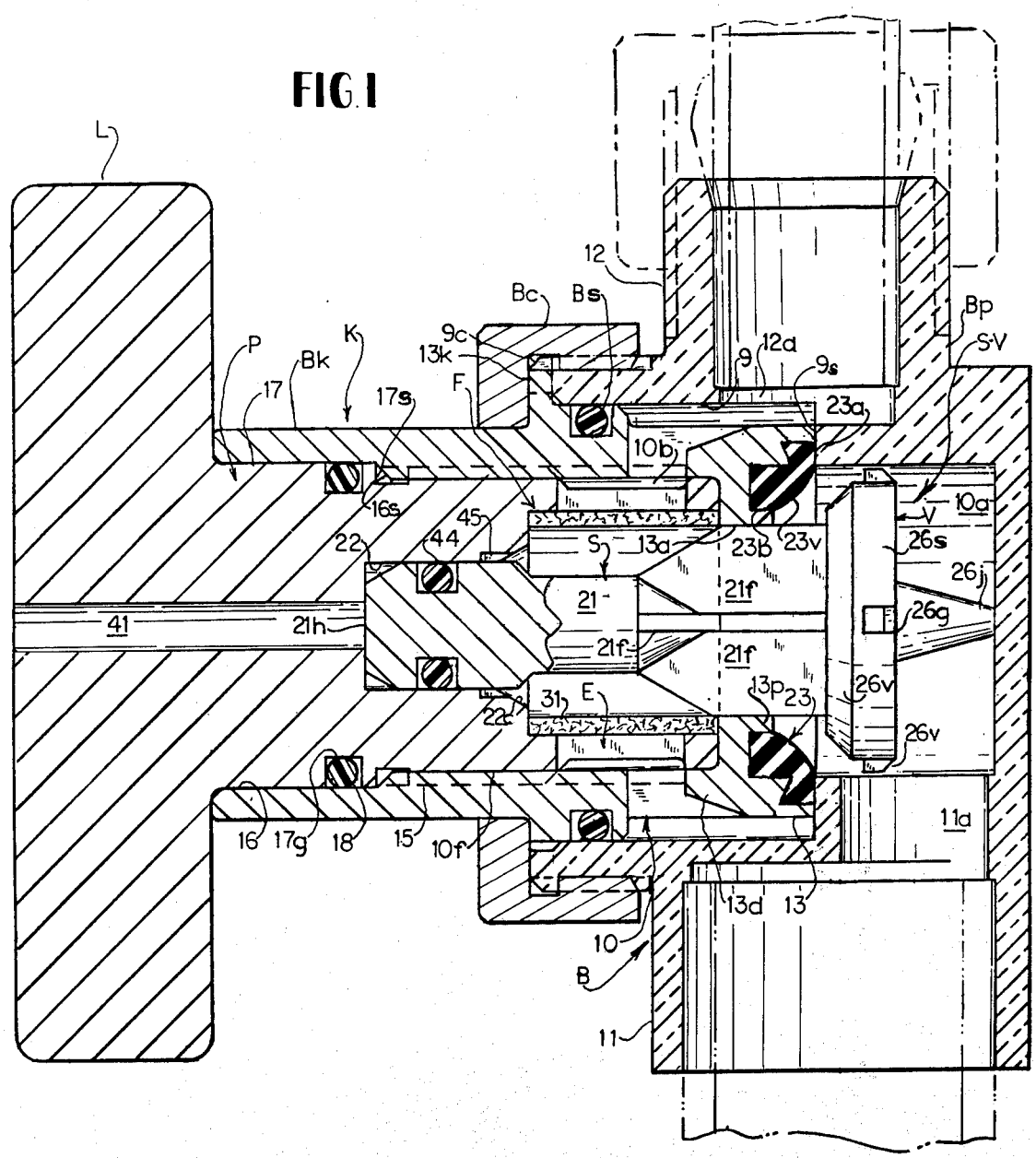
FIG. 1 is an axial section of one valve embodiment.

In the valve of FIG. 1, a hollow valve body B having an interior valving space 10 with inlet and outlet connections 11–12, an apertured seat wall partition 13, and an operating element-receiving bore female-threaded at $10f$ and in effect in its open end smoothly slightly counter-bored at 16, is provided as a composite body by a hollow principal body part $Bb$ with the bore 9 receiving a somewhat sleeve-like body barrel $Bk$ serving as the barrel of a cartridge subassembly K, and a retention cap nut $Bc$, slid over the outer end of the barrel and threaded onto the male-threaded open end of the body part $Bb$, so to bear against a near midlength enlargement externally circumferentially grooved for an "O"-ring $Bs$ sealing the barrel and cartridge to bore 9 in the main body part.

The barrel inner end is partially closed by an integral coaxially apertured inward flange forming the apertured seat wall partition 13, and having a coaxial, doubled, annular end groove formation, in effect a "counterbored groove," receiving an elastomeric seal ring 23 of complex section providing both an endwise barrel seal to shoulder $9s$ and a valving seat on the inner side of wall 13. The circumferential clearance between the surface of the bore 9 and the barrel inner part and a plurality of equispaced longitudinal slots through the barrel wall on the outlet side of wall 13 afford ample flow area to outlet passage $12a$ from the barrel bore as part of the valving chamber space.

Seal 23 element comprises a major annular body portion $23b$ lodged in the flat-bottomed, principal end groove portion about lip $13p$ surrounding the inner end of flow aperture $13a$; and also, for end seal function, a minor outer portion $23a$ lying within, but having an uncompressed axial dimension slightly greater than, the groove counterbore portion, in which an outwardly deepening bottom forms a sloped circular ridge gripping the seal element adjacent the body thereof.

The free right surface $23v$, between the groove engaged parts, curves inwardly toward the female beveled end of lip $13p$; providing an effective valving seat or seal surface convex in section and convergent toward the aperture $13a$. Neoprene is an appropriate elastomer for seal 23 as well as the other seals and "O"-rings mentioned herein.

Preferably, at the outer edge of the male-threaded end of the barrel-accepting cylindrical portion, a notch 9c receives a molded, or otherwise integrally formed, barrel side lug 13k for interlocking the barrel Bk with body part Bp, thereby to insure against barrel rotation in functional manipulation of plug P under all conditions; the depth of the notch being sufficient to insure clearance to the lug so that the lug does not interfere with body advance and sealing at 23a.

A body B, for the non-cartridge type embodiments hereinafter described (e.g. FIGS. 2 and 3), as an integral component includes the structures above detailed as provided in FIG. 1 by the main part Bp and barrel Bk held in their sealed relation by cap nut Bc; but the body in such cases has also an aligned bore from the back end forming the space 10a and closed by a male-threaded plugging cap C as later described.

Figure 2:
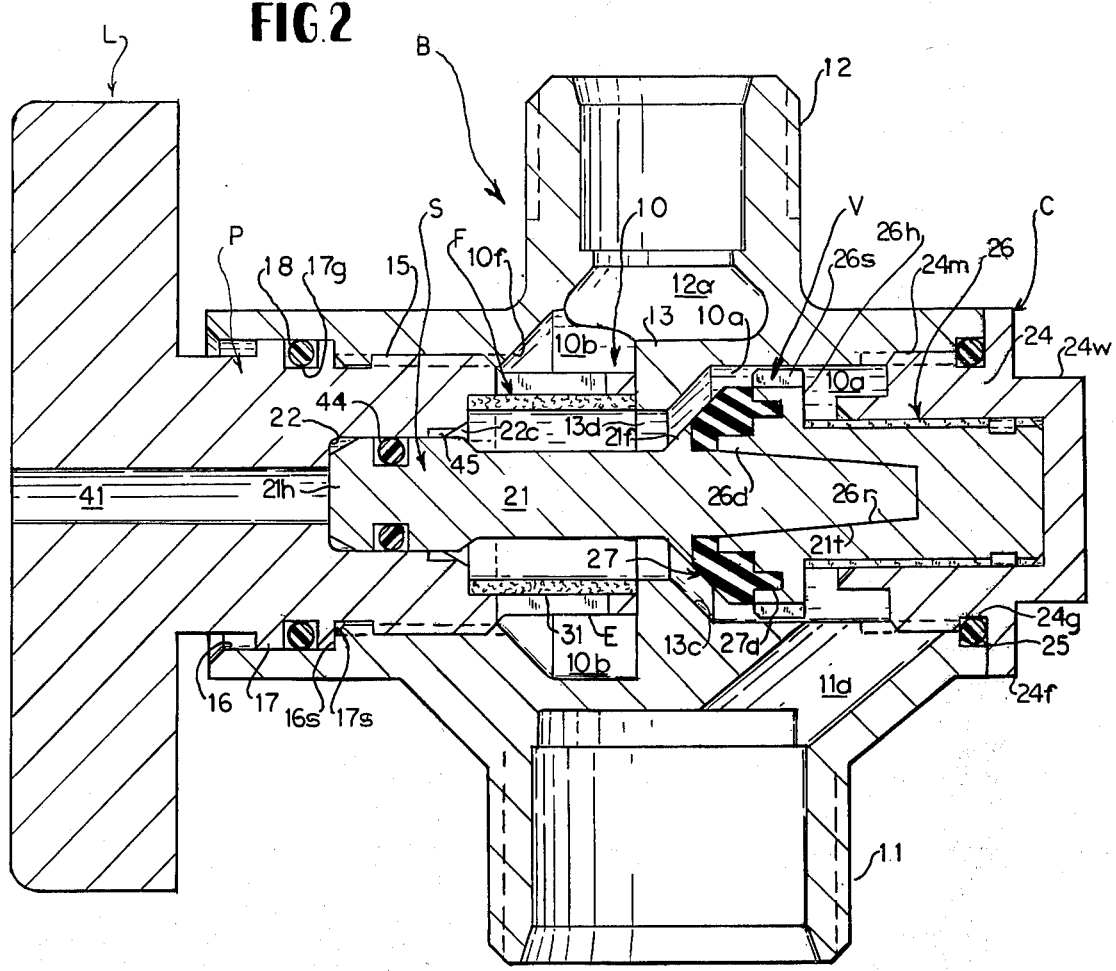
FIG. 2 is an axial section of another valve embodiment.

The valve comprises as principal components an either integral or composite hollow body B having a counterbored open operating end and providing a valving chamber 10 with inlet and outlet connections 11–12 and an apertured seat wall or partition; a male-threaded valve operating plug P in the body open end as a body-closure plug having a threaded engagement with the body; a valving member V carried by a coaxial stem S and axially moveable in the chamber between valve closed and open positions upon rotation-induced axial shift of plug P as a moveable bore closure, having a lost motion connection with the valve member V through the stem; an operating handle L, either conventionally splined or screw-secured on a projecting reduced outer part of the plug or as shown integrally formed on the plug outer end; a cylindrical debris-catching filter screen device F mounted between the plug and seat aperture, within the chamber, and attached to the plug end either by a screwed engagement as in the aforementioned application, or by a preferably interference fit engagement with a plug end formation as shown in FIGS. 1 and 2.

Preferably the female and male threads at 10f and 15 are left hand so that in the operation hereafter described, the valve will conventionally close upon clockwise rotation, and open reversely.

Thus, in the body B, inlet passage 11a opens to a smaller inner valving chamber bore portion 10a; the outlet passage 12a communicates with a bore portion forming an outer valve chamber portion 10b; flow through the valve is controlled by V at wall aperture 13a; and flow through the valved aperture is constrained to pass axially into filter F.

The bore female threads at 10f engage the slightly reduced, male-threaded plug end 15; while the unthreaded counterbore 16 running in from the body open end provides a smooth cylindrical sealing and guiding surface for the slightly enlarged plug outer end 17 rotatably and slideably sealed thereto by an "O"-ring 18 in circumferential plug groove 17g. In FIG. 1, a stop for inward advance of plug P is provided by the outer end of the cartridge barrel Bk encountered by handle L, or by the unitary member S-V (which, as a whole may be considered as a valving member, though described as comprised of stem S and valve member V) bottoming in 10a; but at the inner end of 17, shoulder 17s can cooperate in a stop function with a counterbore shoulder 16s, as in FIG. 2.

The valve member V and stem S in FIG. 1 preferably are cast or molded of plastic as an integral piece including as valve member V a short, principally cylindrical flange-like enlargement 26h with a beveled or conical surface 26v to make initial line seal contact with the seal surface 23v; and having a plurality of at least three equispaced short radial ribs or lugs 26g for guiding sliding contact on the inner bore wall of 10a and defining therebetween flow space past the head; and an axial stop projection 26j to provide space behind and prevent the right or back face from bottoming to the right and thereby becoming operationally immobilized for closing action. To provide principal sliding support and guidance in the cylindrical surface or short bore afforded by the wall aperture 13a, and also ample flow space axially, between V and stem part 21, the enlargement 26h is joined to the smaller part of stem 21 by three or four axially running fin-like stem parts 21f.

The enlargement or head flange 26h, though approaching the diameter of the bore for ancillary guide purposes, thus has many angularly spaced large flow slots 26s, also for dynamic purposes in aiding valve closing under water flow action by creating a back pressure to force the valving member into closed position.

To provide the relatively rotatable and coaxially slideable lost motion connection between stem and plug P, the stem outer shank portion 21 has a slight cylindrical head enlargement 21h slideably received and also thus guided in a mating female axial plug passage or formation 22.

The filter device F, located in the outer part of the valving chamber, i.e., in chamber 10b, which may be termed also a filter chamber, basically is a sleeve or cylinder 31 comprising a filter medium, e.g., a stainless steel screen sleeve retentatively fitted within a plurally longitudinally slotted cylindrical integral plug extension E as a screen carrier which (as also in FIG. 2) for valve open condition effectively abuts endwise on the flat left shoulder surface of apertured partition 13. Preferably, however, the screen 31 and the end of the screen-carrying plug extension E project endwise into a counterbore from the left side about the wall aperture, leaving an annular lip 13d, these parts being dimensioned to maintain effective screening even when the valve just starts to open.

Further to provide slower controlled drainage, an axial passage 41 is provided from the end wall of recess 22 through plug P and out the handle. When a conventional separate rather than integral handle is used, the passage is carried out through the handle-carrying projection. On shank head 21h, notably smaller in diameter than aperture 13a, an "O"-ring type shank sealing element 44 is located in a square-sectioned head groove and slots 45 are provided around the mouth of and leading part way into recess 22. Thus the passage 41 is sealed against leakage until, after valve closure, at least the inward ends of the slots 45 pass the shank seal 44. The taper 22c is provided to prevent damage to the described seal 44 in passing into the recess 22. Other lead-in chamfers are conventionally provided, e.g., from the finished body open end face into counterbore 16 and into female threads 10f.

ASSEMBLY AND OPERATION

The barrel Bk, with cap nut Bc loose thereon and "O"-ring Bs and seal 23 in place, receives plug P (with counter-clockwise rotation of the latter) in turn having "O"-ring 18 and the screen 31 in position forming a first sub-assembly accepting the unitary stem-valve piston member S-V inserted from the right end, thus becoming the full sub-assembly of cartridge K. The complete valve is then constituted merely by sliding the barrel end of the cartridge into bore 9 with rotation if necessary to interlock lug 13k, and screwing the cap nut Bc onto the threaded end of body part Bb to bottom the barrel on shoulder 9s, compressing 23a to effect the seal at that point.

If replacement of the seal 23 ever becomes necessary, this servicing is simply accomplished by shutting down the inlet line, unscrewing Bc to remove the cartridge, pulling out the valving piston member from the cartridge, changing the seal 23, and re-assembling.

Figure 3:
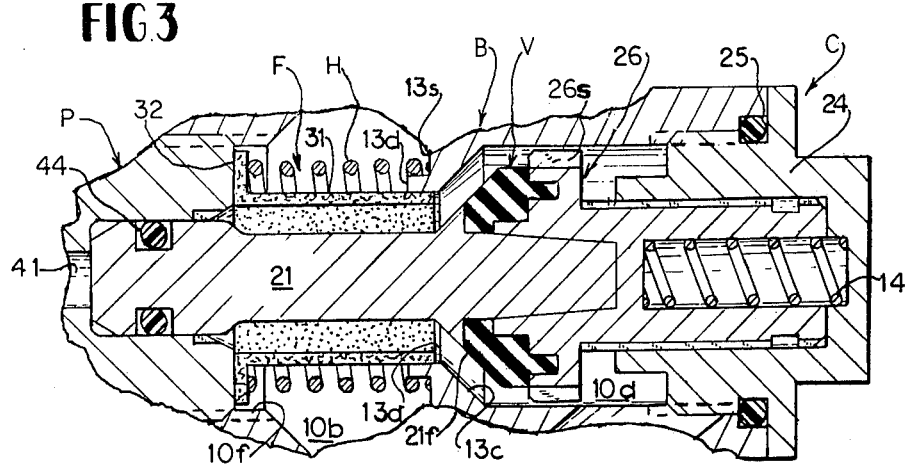
FIG. 3 is a fragmentary axial section showing valve member biasing and also a modification in the filter support structure.

By closing rotation, i.e., clockwise, the plug P retracts or backs out, the stem-valve member S-V following, under supply water static and flow pressure actions alone in FIG. 1, (as in other forms where a bias spring such as 14 in FIG. 3 is not used), and when the valve member engages seal seat 23v, the fluid flow path through the chamber, from inlet to outlet is blocked, and the valve is shut off. Slight further rotation brings seal 44 to the slots 45 to begin controlled drainage. Then if it be desired to remove the filter for cleaning, further clockwise rotation may be simply continued until the plug backs out a bit further to clear the plug threads, bringing the screen with it, as also occurs in FIG. 2.

Also the removal of the plug allows the valve to drain substantially completely, as well as the line connected to its outlet side, the latter of course having air admitted, as by opening a fixture valve.

Necessarily the valve is shut off when access is obtained to the filter for cleaning by plug removal for drainage, so that supply water, especially dangerous when hot, cannot accidentally flood out or spray out on the one servicing it, even though the drainage feature is not incorporated. But with that feature, even where filter function is primarily desired in this as a shut off valve, the plug transit through a drainage condition or setting after the valve is shut off affords like convenience and safety before completion of plug removal in enabling controlled drainage of water in the line on the discharge side of the valve. The valving seal is not subject to damage by over-tightening; and the entire structure represents a sturdy, simple, durable low cost construction.

Since the valving shuttle, that is, the unitary stem-valving member is well supported by the fins 21f and the lugs 26g on adjacent fixed surfaces, the plug is easily reinserted after cleaning with little risk of accidentally displacing the valve member from its sealed contact, before the counter-clockwise rotated plug again attains threaded engagement, thus a re-assembled condition, with the drain seal 44 inward of the taper 22c and slots 45, and the valve off though with drainage open. Furthermore, counter-clockwise plug handle rotation advances the plug over the stem head causing the latter to seal the drainage outlet, with the valve yet off. With continued rotation, the bottom of recess 22 encounters the stem end, starting to back the valve member V away from the seat.

With further counter-clockwise rotation, the plug inward advance continues until encountering a previously mentioned stop, the valve member then being in full open position, with the filter screen simultaneously advanced to endwise engagement either effectively against wall 13 (as in FIG. 2) or within the end of the described counter bore. The "O"-ring 18 seals the plug to the body when the valve is even slightly open; and the plug serves also the function of a bonnet closing the body.

Accordingly the length of the counter bore, the plug and lengths of thread engagement, the stem receiving recess depth and associated slots and shank seal location are selected with appropriate relations for the described mode of operations.

FIG. 2

FIG. 2 shows the above mentioned integral body form which requires the body to be formed with the second end open to accept the valving member, since the apertured partition wall 13 is integral; and accordingly also requires the corresponding fixed closure plug cap C.

In FIG. 2, the plugging cap member C has a male threaded body 24 circumferentially grooved at 24g between stop flange 24f and male threads 24m to accept "O"-ring 25, the outer groove wall being continuous with the flange inner face, with the outer threaded end of the bore providing the cylindrical chamber 10a and having a counter bore cooperating in receiving the plug cap seal ring. The squared or hex outer end 24w affords conventional tool engagement. From the cap inner end, reduced to afford ample flow space from inlet 11a, the cap body is blind bored to slidingly accommodate and guide the valve member stem back shank 26, longitudinally ribbed and grooved to avoid water entrapment.

The stem S in FIG. 2 may be considered as comprised of the elongated front shank 21 and the aforementioned guided back shank 26, i.e., as a composite carrying the valve member V.

Valving member V in FIG. 2 is provided between 21 and 26 by an integral flange-like stem enlargement 26h, and an annular resilient elastomeric seal ring 27 held captive in a circumferential groove-like environment on the stem structure between flat opposed faces of a flange 26h and a buttress-like circumferential flange 21f of 21 by aligned securement of stem end 21t in recess 26r. The front end of 27 outward of, and aligned with, the slope of 21f has a conical or beveled face to seal to the conical valve seat surface 13c provided on seat wall 13 in FIG. 2. This seal assembly is further secured by a rearward cylindrical annular lip 27a received in a stem flange annular groove located outward of a reduced cylindrical end portion 26d of the enlargement projecting into the seal ring.

To provide ample flow space to the valved aperture 13a, this seal ring, of neoprene or the like, in axial section has an appreciably smaller outside diameter than the inside diameter of chamber 10a.

In FIG. 2 and similar structure the inner stem portion 21t is either conventionally male-threaded for securement in the female-threaded coaxial blind bore recess 26r in the back shank portion, or other appropriate securement such as a structural adhesive or an ultrasonic weld may be used especially with plastic stem components.

In FIG. 2, the engagement of either the plug extension on wall 13, or of the plug on the counterbore shoulder affords the plug stop function.

Operation and manner of filter cleaning service for this and further modifications are the same as described for FIG. 1, with the minor differences in assembly consequent upon use of the non-cartridge design as also noted relative to FIG. 3.

FIG. 3

FIG. 3 is similar to FIG. 2, but shows a modification in the filter structure including a filter bias and support helical spring H; and also includes a valve bias spring 14 reacting on the fixed closure, cap C.

Valve bias spring 14, with major length received in a coaxial bore of shank 26, has its outer end engaged and centered in a bottom recess of the cap bore, and accordingly biases the valve to closed position, additionally to pressure and dynamic forces of the flowing water which alone closes the other disclosed forms, when the plug P is backed out allowing the stem and valve member to follow.

In FIG. 3, a filter sleeve with open inner end closely slideably fitted in the partition aperture 13a within piloting lip 13d at least when the valve is open as shown, and having a circular outward flat outer end flange 32 circumferentially clearing the threaded bore portion 10f and bearing concentrically against the flat inner end of and supported by plug P. Preferably (as in FIG. 1) the length of filter member F is such that when the valve closes its inner end is still within the piloting lip 13d. As means to support the filter element on the end of the plug, preferably one end of the coaxially surrounding spring H bears on and presses flange 32 against the plug end; and the other spring end, engaged about locating or pilot lip 13d, bears against adjacent shoulder 13s. When the plug is in axially inward position for the valve full "on," as in the prior figures, water passing the valve member V enters the screen element endwise to flow radially outwardly, and in the bore enlargement 10b to pass through the flow space circumferentially external of the screen to the outlet.

In FIG. 3, upon plug removal, the screen follows as spring H correspondingly extends; allowing the plug to be removed and rendering the filter sub-assembly accessible to be withdrawn from the body for cleaning. With a light spring, having a free length equal to the axial depth into pilot 13d, the screen is then at the bore mouth at the operating end.

With the elements associated with the stem and the plug cap respectively sub-assembled, the cap-carried stem and valve member are inserted into chamber 10a and the cap C threaded into the threaded part of bore 10a, bringing the seal of V against the seat 13c, that is, to a closed position under bias of spring 14. For FIG. 3, then from the outer end, the extended compression spring H, with filter screen F in its outer end is inserted to engage the spring inner end on the piloting or support lip 13d to which the spring in turn supports and guides the screen end.

After insertion of plug P into counterbore 16 to bring its recess mouth over the head end of shank 21, rotation counter-clockwise engages the threads, starting plug advance. As the plug advances inwardly, in the case of FIG. 3 it engages the screen flange, moving the screen in and compressing H.

FIG. 4

Figure 4:
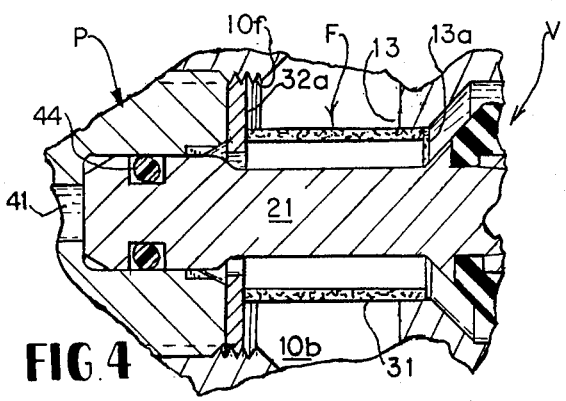
FIG. 4 is a fragmentary axial section showing another modification in the filter.

Alternatively for filter positioning (see FIG. 4), the spring H of FIG. 3 (or FIG. 5) may be omitted and the filter sleeve flange 32 of FIG. 2 (or analog) peripherally retentatively engage the actuating plug receiving bore on the excess depth of bore threading at a plane just inward of the inmost position of the plug. For example, the flange may frictionally lightly engage so that it may be placed initially somewhat outward of final position, though with sleeve inner end within 13a, and then advanced to final position in close contact with the plug end by the initial valve opening advance; but as in FIG. 4 shown, the flange may be provided by an annular disk 32a with edge threaded into bore threads 10f to which the screen sleeve 31 is attached, e.g., by brazing a stainless steel screen; the flange-forming disk member 32a then having a tool engaging formation, such as a non-circular, say hex edge central aperture through which 21 extends into the plug.

FIG. 5

Figure 5:
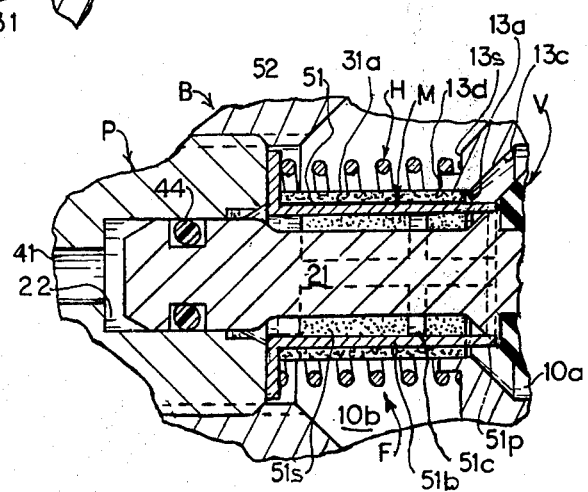
FIG. 5 is a fragmentary axial section showing a further modification in the filter.

In FIG. 5 there are shown modifications independently applicable to prior figures, first in the removal from stem 21, of its valve member operating function above described, and also in the use of a filter structure needful for valve actuation by virtue of inclusion of the independent screen support element M, fabricated for example by molding from a plastic, such as "Celcon" of Celanese Plastics Co., which is suitable generally for the rigid plastic components in these valves. In filter support M in effect there is a slotted cylindrical body 51 with outer integrally flanged end 52 bearing against the plug inner end, which though operable as a free floating member, preferably analogously to screen flange 32 in FIG. 3, is under the action of spring H, otherwise arranged as in FIG. 3; and having its inner end located and preferably supported within the partition aperture 13a; member M supporting screen means having, if not integral with M, an interference fit coaxially in or on the support, for example, the depicted screen 31a fitted around member M.

Broad interrupted longitudinal slots in the cylindrical "body" 51 provide a cage of four narrow bars 51b running from a full annular body part adjacent flange 52, to and beyond a second full annular body part 51c, from which the bars project past the end of the filter screen in stem-engaged free prongs 51p.

Thus ample flow space is afforded between the prong portions of the filter support bars to the interior of the holder M and the supported screen, and thence radially through the cage openings and the screen to chamber space 10b, the path to which flow is constrained as previously by the sliding embracement of the screen end in aperture 13a.

If desired, rather than having the previously described lost motion sliding connection between the valving member V and plug P through the medium of stem part 21, especially where a line draining function is not to be included, yet even with that function, the screen holder M may serve as part of the actuator for the valving member, through engagement of the pronged inner end of holder M with a flat shoulder afforded by a circumferential groove in the conical end of the flange 21f.

Where the drainage functionability is omitted, the stem portion 21 may be truncated just short of flange 21f; but where retained as in FIG. 4, an arrangement preferable because of the three place guiding for the valve member, the operating plug recess 22 is deepened somewhat to ensure end clearance between the recess bottom and head 21h when holder M engages the valving member structure V at flange 21f. Apart from this assumption of valve member actuation by the filter holder M, the structure and operation is similar to those described for FIG. 2, with the alternatives of use or not of the valve bias spring. However, since it is the screen support which displaces the valve member from closed position, after a filter-cleaning operation, the valve cannot be turned on and the controlled line returned to service without replacing the screen; as in FIG. 2.

FIG. 6

Figure 6:
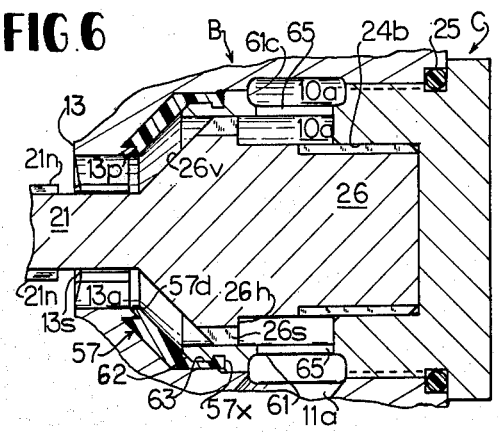
FIG. 6 is a fragmentary axial section showing a modification of the cooperating valving seal and valving member.

Fragmentary FIG. 6 is intended to show primarily structure relating to the valving seal arrangment, which though showing a valving member without spring biasing to closed position, nor entry of any part of the filter structure into the aperture of partition 13, is applicable to the previously described valve forms. Like or similar reference numerals are used to designate parts like or analogous to those of prior figures.

In FIG. 6, the seal member 57 in form is basically conically annular to correspond to the sloped or conical rear face of partition 13 against which it is seated, rather than being carried on shiftable valving member V. This permits the latter to be fabricated from the start as one piece including integrally the previously described front stem portion 21, a rear stem portion 26 again slidably received in and by the cap C guided coaxially shiftably in the rear body bore, and a head 26h with peripherally spaced flow slots 26s; the head tapering to the front stem through a male conical valving surface 26v complementary in shape to and sealing to the female conical rear surface of 57 upon valve closing.

Cap C in FIG. 6 has a hollow cylindrical forward extension 61 with an inside diameter larger than, and thereby in effect counterbored to, the cap blind bore 24b to afford a surface guiding the head 26h. External grooving of the extension leaves an enlargement 61c, for slip fitted engagement with a cylindrical part of the body rear bore between the inlet passage 11a and the seal receiving socket region of the bore. Hence the rear bore chamber flow space 10a rearward of 61c is divided by the extension 61 into an annular external space for flow from 11a, and an interior space for axial flow about 26 to head slots 26s, which flow spaces are connected through the several longitudinal shell slots 65.

The front central apertured region of seal 57 is grooved to form a lip 57d fitting over a rearwardly projecting, seal-retaining circular lip 13p, about the rear end of aperture 13a, while the cylindrical outer seal periphery at its back edge has an extension carrying an inward circular lip 57x engaged in an external circumferential groove 63 behind a front end bevel 62 of the integral shell-like extension 61. With this arrangement the seal 57 is insertable and removable with the modified cap C, and the valving member head periphery is guided coaxially of the bore by the smooth internal cylindrical shell area forward of slots 65.

However, by the simple omission of the seal extension bearing lip 57x, the seal becomes independent of the cap, and then a preferably greater-than-four plurality of equi-spaced longitudinal access slots 13s in the cylindrical aperture 13a, in radial depth as great as the thickness of pilot lip 13p and having respective fin lead-in flared mouths at the left, may afford easy access to the underside of seal lip 57d, for seal engagement and removal by a multi-pronged or finned tool inserted from the valve body front or rear; or by the shiftable valving member-stem composite provided, on the stem portion 21 and well spaced from the surface 26v, with two or more longitudinal integral fins 21n appropriately spaced and radially long enough to fit into corresponding access slots.

Though with the several disclosed primary valving seals, for the invention embodied in shutoff fittings for sanitary fixtures, the fitting size will be such that only a narrow radial dimension, on the order of 0.050 inch, for example, will be present in the water flow occluding seal area, an even smaller area, hence greater sealing contact pressure, can be easily obtained by using a slight convexity or thin annular rib on one of the contacting elements, preferably on the elastomeric seal.

The general valve structure herein described offers also advantages as to fabrication. For example, the body part Bb in FIG. 1, or the hollow body B of subsequent figures may be produced first as a "blank" by modern techniques of forging or extrusion to gross external form, and thereafter machined for the several bore and passage formation. Or the body may be made by casting with appropriate coring, also with approximately sized open-ended chamber, inlet and outlet passages, followed by minimum machining. In the case of extrusion, a bar may be produced of solid section represented by the body external outline of the drawings, and then cut into successive blocks forming the blanks for subsequent machining. The inlet and outlet connections 11–12 in FIG. 2, for example, are shown nearly aligned, with the inlet passage 11a extending oblique to the body main axis at an angle allowing 11a to be machined from the open end of 10a; the coaxial alignment of 11 and 12 facilitating machining of male or female pipe threads, or threads for compression fittings, or standard sockets or external diameters for pipe sweated connections. For plastic pipe systems the body may likewise be made of molded or molded and machined plastic material, the connection formations being compatable with the system.

The filter device F may take the form of wire screen of appropriate mesh and metal, with the flange made simply by forming the mesh stock, possibly reinforced by brazing to a stamped sheet metal ring affording greater strength; or it may be made as a molded plastic element with integral flange and integral longitudinal strengthening ribs running to an annular solid end formation.

FIG. 7

In the drawing FIG. 7, there is a body modification of distinct advantage in contrast with common practice. A connection from rigid water pipe to a use device, such as a sanitary fixture or other water utilization structure, usually involves a flexible or bendable supply tube and a fitting, e.g., a union or a supply valve, of either a simple shutoff or a stop and waste type, with the inlet and outlet sides of the fitting united to the inlet line and the so-called "supply" tube through threaded, soldered, or flare joints, or use of compression fittings or a combinataion of these joints. Most commonly the fitting is soldered to the inlet line and on the outlet side a compression joint is made with the flexible supply tube or outlet line.

Several disadvantages are attendant upon such conventional structures and practices. First on initial installation, the outlet line to the fixture has to be cut to a rather exact length, since the locations are already fixed for the fixture and the roughed-in pipe. Secondly, in the event that the fitting, stop-and-waste valve or other fitting, has to be replaced, usually in removal of the old fitting a part of the inlet line or the outlet line is damaged or destroyed, or cut away, requiring insertion of soldered or other sleeve or coupling elements to restore requisite length. Thus for removal of the fitting, it may be necessary to cut one or the other lines where soldered joints are used. Or where a flare or compression fitting is used on the outlet side, in order to emplace the nut of the new fitting, it is necessary to cut off the tube end which is flared or bears a clinched-on tapered collar or ferrule from the original installation.

Further both in original installation and in replacement operations, if the supply tube or outlet line is out of round at the section where the compression joint is to be made, it is often impossible to effect a suitable water-tight joint. Moreover, where the fitting in question is a simple usual type union with a metal-to-metal seal, often upon reuse the seal cannot be easily re-established, because corrosive action of the water during prior service had effected the joint area.

Here the body B, which may be considered a union body or the body of a fitting having a union function, on respective sides has an inlet connection formation 111 and an outlet connection formation 112, both male threaded at 111a, 112a to receive respectively seal compression nuts 113, 114 through which the round plain-ended inlet and supply tubes or pipes I and O are slidingly telescoped into the body. The inlet connection formation 111 is bored at 111b down to a shoulder 111s affording a socket receiving the end of the inlet piping I in slide-fitting embrace, the socket depth being sufficient by ordinary considerations for a stable joint structure. The outer socket end is counterbored at 111c to accommodate the elastomeric O-ring type seal element 115 which, by tightening up nut 113, is axially compressed with radial expansion to effect the inlet joint seal. The socket depth may be on the order of say the diameter of the inlet pipe for which the fitting is designed. Similarly a socket bore 112b to shoulder 112s, a counterbore 112c and an elastomeric seal ring 116, are included for like purpose in the outlet connection formation; but the socket in the latter has an axial depth purposely much greater than would be required by ordinary consideration for an appropriate reception of the end of the outlet tube O.

The excess depth of the outlet formation, that is, that exceeding the depth of insertion of the outlet tube normally required by good practice for the sealed joint with copper material, will be equal at least to the minimum bore depth to the socket shoulder on the inlet side, plus an additional excess as may be desired to accommodate length variations.

For this arrangement, the nuts 113, 114 are slipped onto the respective tubing ends and, with the seals in the respective body counterbores and tubing O deflected laterally out of alignment with tubing I considered as a rigid tube, the end of the outlet tube is inserted into the body, for example, into the full depth of the outlet socket; the body or fitting is swung into alignment with the inlet tube and axially displaced over the end thereof, to the full depth or sufficiently to attain the stable seal; and the nuts 113 and 114 are tightened to complete the joint. Hand tightening may be sufficient by appropriate selection of the O-ring material and section and of the tube-to-counterbore radial gap.

For example, the seals each have an oval cross-section, with the long axis of the oval parallel to the annular axis, and with the oval seal inside diameter being no smaller than the outside diameter of the tubing. For typical half-inch water inlet lines, where a somewhat smaller "supply" tube O would be used, as placed, the seal would be typically projecting 1/16 inch from the counterbore, in the case where an elastomer of about 70 Durometer is used.

The use of a simple Tinnerman type push nut on the outlet tube, beneath the nut 114 will insure against pressure displacement of the fitting up tube O and off the rigid inlet tube I under quite high water source pressures through an axial force differential due to the difference in inlet and outlet socket cross-section areas.

Where the outlet tube O is relatively soft or long, and high pressures, said 125 psi, are encountered, some lateral yielding of the tube O may tend to allow forcing the outlet tube out of the body or the body off the inlet despite frictional engagement by the elastomeric seals; but for usual lengths of fixtue "supply" tubes, i.e., outlet tubing "O", the frictional engagement by the seals is sufficient for retention.

What is claimed is:

1. A shutoff valve comprising:
   a hollow valve body having aligned rear and open front operating bore portions separated at inward ends by a centrally apertured partition;
   said front bore portion having a smooth region from its open outer end inward to a female-threaded region of reduced diameter to receive a moveable closure serving as a valve operator and the back end of the rear bore being closed, thereby defining a valving chamber partitioned at the inner ends of the aligned bore portions;
   said body having an inlet connection and an outlet connection to inlet and outlet passages opening respectively to the valving chamber on opposite sides of the apertured partition affording a flow path valved at the aperture of said partition;
   a valving member guided coaxially of and axially shiftable in the rear bore, between a valve closing location where the valving member seals against said partition to block said aperture, and valve open locations away from the partition;
   a valving-member-operating structure inlcuding a valve operator member comprising a rotatable and axially shiftable plug providing said moveable closure and having
      an inner male-threaded end engaged in the female threaded region of the front bore portion,
      and an unthreaded outer end slidably received in and rotationally and axially slidably sealing with said smooth end; and means forming an extension from one of, and engageable endwise with the other of, the respective inner ends of said members, whereby said valving member may be displaced from closed position by an advance of said plug into the front bore by plug rotation in one direction, and said plug may be backed out from said front bore after the valving member reaches the closed position during rotation in the other direction; and
   a filter element supported between said plug and aperture.

2. A shutoff valve as described in claim 1 wherein said valve body is a composite body constituted of a main hollow body part, a barrel part engaged therein, and securing means securing said parts in a sealed engaged relation;
   said main body part being bored and counterbored from an open front end to form a principal bore terminating at an inward shoulder, and a minor bore portion of reduced diameter constituting said rear bore portion;

said barrel part comprising a sleeve-like element slidably fitted in said principal bore, said sleeve element providing said front bore portion and having an inner end formation forming said apertured partition and bearing an elastomeric annular element sealing the barrel endwise to said shoulder, the inner region of the sleeve adjacent the end formation being slotted at the outlet of said chamber, said main body part including said inlet and outlet connections and passages to said chamber;

said sleeve element, axially outward of its slotted region and of said outlet passage, being circumferentially sealed to the said principal bore.

3. A shutoff valve as described in claim 2, wherein said elastomeric annular element sealing said barrel endwise said shoulder includes a circumferential portion inward of said shoulder providing a seat surface engageable by said valving member in a valve-closing motion, thereby to effect a valve-closing sealing contact with the valving member.

4. A shutoff valve as described in claim 2, wherein said main body part is provided with a male-threaded cylindrical portion surrounding the outer end of the principal bore; and said barrel bears an external circumferential flange engageable endwise with said cylindrical portion; and said securing means includes a compression nut received on said barrel against said flange and threaded onto said cylindrical portion to hold the barrel compressing said annular elastomeric seal.

5. A shutoff valve as described in claim 4, wherein said barrel includes a lug engaged in a corresponding notch of the body part to secure the barrel against rotation during rotational operation of said plug.

6. A shutoff valve as described in claim 1, wherein said valve body provides, in an integral structure, said front and rear bore portions, said apertured partition, and said inlet and outlet connections and passages, with said rear bore portion opening at the back end of the valve and being female-threaded; a back closure comprising a hollow male-threaded plug being received in and threaded into the rear bore portion.

7. A shutoff valve as described in claim 6, wherein said apertured partition about the inlet side of the aperture has a coaxial seat seal accepting formation;

said hollow plug includes a coaxial hollow integral extension and provides a bore and in the extension a counterbore, an external end formation on the extension for carrying a seat seal received in the accepting formation, a circumferential exterior flow groove to which the said body inlet passage communicates, and spaced apertures from said groove into the extension counterbore;

an elastomeric seat seal is engaged on the said end formation of the hollow plug and received in sealed rotation by the body in said accepting formation;

said valving member includes a valving head enlargement and a reduced back stem portion respectively slidably guided by the counterbore and bore walls, the valving head enlargement having through its periphery flow slots affording communication between the extension counterbore space on the front and back sides of the head enlargement;

the front side of the head enlargement and said seat seal having complementarily shaped contactable circumferential areas to effect valve closing sealing upon engagement of the valve member head enlargement with the seat seal.

8. A shutoff valve as described in claim 7, wherein the accepting formation includes an annular flange about the partition aperture;

the seat seal includes a lip overlapping the last said annular flange;

the partition aperture has a plurality of spaced axially extending slots in radial depth penetrating the annular thickness of the last said flange;

said valving member has a front stem portion extending through the aperture and bearing fins at a location forward of the partition, said fins being spaced correspondingly to and slideable through said slots of the aperture when the back closure plug is removed, whereby the valve member by engaging the seat seal lip may serve as a removal tool in the event of seat seal escape from the extension upon back closure removal.

9. A valve fitting as described in claim 1, adapted to serve as a union fitting joining a liquid source tube and a discharge tube, wherein:

said inlet and outlet connections include:

respective hollow cylindrical formations integral with and projecting from opposite sides of said body with parallel cylinder centerlines in near alignment and with outer ends male-threaded, the hollow shapes of said formations providing bores receiving in slip-fitted telescoped relation the respective ends of liquid source and discharge tubes to be connected by the fitting, and having respective shallow radially shouldered counterbores;

an elastomeric annular seal element seated on the shoulder in each counterbore and having an oval cross section with major axis parallel to the axis of the element, each seal element being dimensioned to lightly embrace the circumference of a said tube telescoped in the respective bore, and to project endwise from the counterbore, when initially seated therein; and compression nut means received on the male-threaded end of each said formation and about the corresponding said tube and applying force axially compressing the respective seal element from its initially projecting disposition into a tube-restraining and tube-sealing relation with the body; the bore of the inlet formation terminating at a shoulder stop affording a bore length ensuring a stable alignment of the source tube received therein;

the length of the outlet formation bore equalling the length of the inlet formation bore plus at least the length of discharge tubing required to be received in the outlet formation bore for ensuring a stable alignment of the discharge tube received therein.

10. The fitting as described in claim 9, wherein said coupling nut means on the outlet formation includes an annular inward nut flange overlapping the respective seal element and a dished annular locking disk fastener disposed between the nut flange and the counterbored end of the outlet formation and thereby flexed into discharge tube retaining relation.

11. A shutoff valve as described in claim 1, wherein said valving member includes a back stem portion; and valve closing bias is applied to the valving member by compression spring means interposed axially between the back stem portion and the body.

12. A shutoff valve as described in claim 1, including front stem means coaxial on said valving member, and a valve drainage discharge passage coaxial through said plug to open interiorly of said body through a shouldered cylindrical passage mouth at the plug inner end, and to open exteriorly of said body for valve drainage discharge, the discharge passage providing a drainage path opened and closed by axial positioning of an end portion of said front stem means slideably received in and sealed to said mouth;

said operating structure adapted upon plug rotation in one direction with said plug advancing into the body and sealing to said smooth region of the front bore portion to displace said valving member into a valve open position and by plug retracting rotation in the other direction to control shift of said valving member to a flow blocking position against the apertured partition, with the plug retracted yet in threaded and sealing engagement with the body when the valve closes, upon further plug retracting rotation axially positioning the plug relative to said front stem means to open said drainage path, and with still further retracting rotation to free the plug from the bore for removal with the inlet shut off.

13. A shutoff valve as described in claim 12, wherein a filter element support sleeve, spring-held on the end of the operator member and interposed between said valving member and operator member, forms the extension whereby the valving member may be displaced from the valve-closed position.

14. A shutoff valve as described in claim 12, wherein the front stem means forms the extension whereby the valving member may be displaced from the valve-closed position.

15. A shutoff valve as described in claim 14, wherein said valving member integrally comprises a valving head slidably guided on the bore wall in the rear bore portion and having spaced flow slots through its periphery and having on one side, disposed to the partition, an annular contact face for making a valve-closing sealing contact with a valve seat on the partition;

a central projection from the other head side engageable with an end wall of the rear bore portion to limit valving member displacement away from the partition;

a plurality of angularly spaced flat fins projecting from the region of said one side of the head circumscribed by said annular contact face, and having longitudinal edges in valving member guiding, sliding engagement in the partition aperture.

16. A shutoff valve as described in claim 1, including as said filter element, a cylindrical filter element in coaxially spaced disposition relative to said extension and having an open inner end received in the aperture of the partition at least when the valve is open; and support means supporting the outer end of the filter element.

17. A shutoff valve as described in claim 16, wherein said cylindrical filter element on its other end includes, as said support means, an external circumferential flange removably peripherally engaged with the wall of the said front bore portion.

18. A shutoff valve as described in claim 17, wherein the partition aperture includes a counterbore slidably receiving the end of said sleeve formation of the plug, as plug advance starts opening of the valve.

19. A shutoff valve as described in claim 16, wherein said support means includes a circumferential external flange on the other end of said cylindrical filter element, and an endwise projecting formation on the inner end of said rotatable plug within which the circumferential flange is engaged; the filter inner end being axially shiftable in said aperture.

20. A shutoff valve as described in claim 16, wherein said support means includes an external circumferential flange carried on the other end of the cylindrical filter element, and engageable with an inner end face of said rotatable plug; and a helical compression spring coaxially disposed about the filter element and interposed between the flange and the partition to hold the flange on the plug end face;

said inner end being axially shiftable in said aperture, whereby on backing out of the plug the filter follows under bias of said spring;

said partition having about said aperture a pilot lip for the inner end of the spring.

21. A shutoff valve as described in claim 16, wherein said support means comprises a rigid sleeve with one end extending into said aperture and other end externally circumferentially radially flanged to afford a bearing surface engageable by the inner end of the plug, said sleeve being longitudinally slotted to afford a fluid flow path into the sleeve interior at its inner end and outward in the region between plug and partition;

said rigid sleeve retentively carrying the cylindrical filter element telescoped thereon; and a helical compression spring interposed between said partition and said flange in substantially coaxial relation to said sleeve and filter element;

the inner end of the filter element being axially shiftable in said aperture, whereby on backing out of the plug, the filter follows under bias of said spring;

a pilot flange on said partition about said aperture for locating the inner end of the spring; said sleeve engageable with the valving member and providing the said means forming a said extension for operatively displacing the valving member.

22. A shutoff valve as described in claim 16, wherein said filter element is an annularly cylindrical element; the valve operator plug at its inner end bears a coaxial integral sleeve formation; providing a cylindrical end recess having said filter element fitted therein, and having a plurality of spaced longitudinal flow slots opening radially from the filter element circumference to provide a flow path from the partition aperture endwise into the filter and to flow space defined between the sleeve formation and the bore wall.

* * * * *